US012568047B2

(12) United States Patent
Lin et al.

(10) Patent No.: US 12,568,047 B2
(45) Date of Patent: Mar. 3, 2026

(54) USING UDP PORT NUMBERS FOR SERVICE DELIMITING, SUCH AS FOR DELIMITING VIRTUAL ROUTING AND FORWARDING INSTANCES IN LAYER 3 TUNNELS

(71) Applicant: Juniper Networks, Inc., Sunnyvale, CA (US)

(72) Inventors: Wen Lin, Andover, MA (US); Kevin Wang, Acton, MA (US); Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 151 days.

(21) Appl. No.: 18/372,088

(22) Filed: Sep. 23, 2023

(65) Prior Publication Data

US 2025/0007834 A1      Jan. 2, 2025

Related U.S. Application Data

(60) Provisional application No. 63/523,877, filed on Jun. 28, 2023.

(51) Int. Cl.
*H04L 45/745* (2022.01)
*H04L 45/02* (2022.01)
*H04L 45/586* (2022.01)

(52) U.S. Cl.
CPC ............ *H04L 45/745* (2013.01); *H04L 45/02* (2013.01); *H04L 45/586* (2013.01)

(58) Field of Classification Search
CPC ... H04L 12/4633; H04L 45/02; H04L 45/586; H04L 45/745
See application file for complete search history.

(56) References Cited

U.S. PATENT DOCUMENTS

| | | | | |
|---|---|---|---|---|
| 8,527,662 | B2 * | 9/2013 | Biswas | ............... H04L 61/5092 |
| | | | | 709/227 |
| 10,623,505 | B2 | 4/2020 | Khakimov | |
| 2003/0115480 | A1 * | 6/2003 | McDysan | ........... H04L 63/1458 |
| | | | | 713/153 |
| 2006/0174108 | A1 * | 8/2006 | Loughran | ............. H04L 1/0061 |
| | | | | 713/160 |

(Continued)

FOREIGN PATENT DOCUMENTS

EP            3968172            3/2022

OTHER PUBLICATIONS

K. Patel, et al., "The BGP Tunnel Encapsulation Attribute," Request for Comments (RFC) 9012 (Internet Engineering Task Force (IETF), Apr. 2021).

(Continued)

*Primary Examiner* — Jeong S Park
(74) *Attorney, Agent, or Firm* — John C. Pokotylo; Pokotylo Patent Services

(57) ABSTRACT

Different services through Virtual Routing and Forwarding instances (VRFs) are identified without needing a Multiprotocol Label Switching (MPLS) label or a Virtual Extensible Local Area Network (VXLAN) Network Identifier (VNI) by using, for example, different UDP port numbers to identify different connectivity services (e.g., customers, VRFs) when IP-in-IP (also referred to as IP over UDP) is used as a tunneling mechanism (e.g., in the data center).

16 Claims, 10 Drawing Sheets

(56)               References Cited

U.S. PATENT DOCUMENTS

| | | | |
|---|---|---|---|
| 2010/0306378 A1* | 12/2010 | Christenson ........ | H04L 61/5046 |
| | | | 709/226 |
| 2013/0318233 A1* | 11/2013 | Biswas .............. | H04L 61/5092 |
| | | | 709/224 |
| 2016/0359745 A1 | 12/2016 | Hao | |
| 2017/0093641 A1* | 3/2017 | Utgikar ................. | H04L 45/036 |
| 2020/0106641 A1* | 4/2020 | Kommula ............. | H04L 45/306 |
| 2020/0295969 A1* | 9/2020 | Wang ................. | H04L 12/4641 |
| 2024/0039792 A1* | 2/2024 | Berzin .................... | H04L 67/60 |
| 2024/0356850 A1* | 10/2024 | Bandekar ............. | H04L 45/745 |

OTHER PUBLICATIONS

Extended European Search Report to counterpart European Patent
Application No. 24177070.0-1218, dated Oct. 18, 2024.
Configuring Generic UDP Encapsulation (Cisco).

* cited by examiner

| IP Bit Offset | 0-3 | 4-7 | 8-13 | 14-15 | 16-18 | 19-31 |
|---|---|---|---|---|---|---|
| 0 | Version | Header Length | DSCP | ECN | Total Length | |
| 32 | Identification | | | | Flags | Fragment Offset |
| 64 | Time to Live | | Protocol 237 | | Header Checksum | |
| 96 | Source Address | | | | | 235 |
| 128 | Destination Address | | | | | |

| UDP Bit Offset | 0-15 | 16-31 |
|---|---|---|
| 160 | Source Port Number | Destination Port Number 225 |
| 192 | Length | Checksum |
| 224 | Payload | |

USING UDP PORT NUMBERS FOR SERVICE DELIMITING, SUCH AS FOR DELIMITING VIRTUAL ROUTING AND FORWARDING INSTANCES IN LAYER 3 TUNNELS

§ 0. RELATED APPLICATION(S)

This application claims the benefit of U.S. Provisional Application No. 63/523,877 (referred to as "the '877 provisional" and incorporated herein by reference), titled "USING UDP PORT NUMBERS FOR SERVICE DELIMITING, SUCH AS FOR DELIMITING VIRTUAL ROUTING AND FORWARDING INSTANCES IN LAYER 3 TUNNELS," filed on Jun. 28, 2023, and listing Wen Lin, Kevin Wang, and Kireeti Kompella as the inventors. The scope of the invention is not limited to any requirements of the specific embodiments in the '877 provisional.

§ 1. BACKGROUND OF THE INVENTION

§ 1.1 Field of the Invention

The present application concerns network communications. In particular, the present application concerns tunnels in networks providing layer 3 (L3) only services.

§ 1.2 Background Information

One of the most commonly used network topologies for Data Centers (DCs) is the leaf-spine topology, which offers high bandwidth and resiliency. Overlay tunnels are used in DCs to create a virtual network that runs on top of the physical infrastructure. Overlay tunnels allow different customers or a connectivity services (e.g., pseudowire), to share the same physical network while maintaining isolation and security. This is commonly referred to as "multi-tenancy". This is typically achieved using Virtual Routing and Forwarding (VRF) instances. In the forwarding plane at egress, each VRF is usually identified using an identifier such as, for example, a multiprotocol label switching (MPLS) label for layer 3 service or a VXLAN Identifier for layer 2 or layer 3 Ethernet Virtual Private Network (EVPN) over an Internet Protocol (IP) fabric.

For pure IP fabric networks, it is sometimes desirable to avoid using MPLS or MPLS over "X" encapsulation in the overlay; that is, to stay with IP. For example, some commercial chipsets do not support MPLS well. For a next generation DC over IP fabric that provides layer 3 services, there is a need to identify different services through VRFs without needing an MPLS label or a VXLAN Network Identifier (VNI).

Each of the following references is incorporated herein by reference.

Postel, J., et al., "User Datagram Protocol", *Request for Comments (RFC)* 768 (Internet Engineering Task Force (IETF), STD 6, RFC 768, August 1980) (referred to as "RFC 768" and incorporated herein by reference).

Postel, J., et al., "Assigned Numbers," *Request for Comments (RFC)* 790 (USC/Information Sciences Institute, September 1981) (referred to as "RFC 790" and incorporated herein by reference).

Bradner, S., et al., "Key words for use in RFCs to Indicate Requirement Levels", BCP 14, *Request for Comments (RFC)* 2119 (Internet Engineering Task Force (IETF), March 1997) (referred to as "RFC 2119" and incorporated herein by reference).

S. Deering, et al, "Internet Protocol, Version 6 (IPv6) Specification," *Request for Comments (RFC)*: 2460 (Internet Engineering Task Force (IETF), December 1998) (referred to as "RFC 2460" and incorporated herein by reference).

M. Eubanks, et al. "IPv6 and UDP Checksums for Tunneled Packet," *Request for Comments (RFC)*: 6935 (Internet Engineering Task Force (IETF), April 2013) (referred to as "RFC 6935" and incorporated herein by reference).

K. Patel, et al., "The BGP Tunnel Encapsulation Attribute," *Request for Comments (RFC)* 9012 (Internet Engineering Task Force (IETF), April 2021) (referred to as "RFC 9012" and incorporated herein by reference).

§ 2. SUMMARY OF THE INVENTION

There are different tunnel mechanisms that can be used for the next generation DC that provide layer 3 only services, such as IP-in-IP or SRv6. Compared with SRv6, when IP-in-IP tunnel(s) is used for the overlay, the underlay can be either IPv4 or IPv6 network. An IP-in-IP tunnel is usually not restricted to the feasibility of SRv6 support in the hardware. For an IP-in-IP tunnel, typically different IP loopback address is used as the tunnel destination address for different services. However, this does not scale (e.g., on the order of 1,000 VRFs) well in the DC and adds a lot of provisioning overhead. To support IP-in-IP (also referred to as IP over UDP) tunnels in a way that scales well, the present inventors propose using different UDP port numbers in the overlay to identify different connectivity services (e.g., customers, VRFs) when IP-in-IP (also referred to as IP over UDP) is used as a tunneling mechanism (e.g., in the data center).

Different UDP port numbers are used in the overlay to identify different connectivity services, customers, and/or VRFs when IP-in-IP (also referred to as IP over UDP) is used as the tunneling mechanism in the DC.

Example embodiments consistent with the present description may identify different services through VRFs without needing an MPLS label or a VXLAN Network Identifier (VNI) by providing a computer-implemented method comprising: (a) allocating, by a network device at the egress of an IP over UDP tunnel and belonging to a shared network, (1) a UDP destination port value for the IP over UDP tunnel to (2) a unique instance of a private connectivity service; and (b) associating, by the network device at the egress of the IP over UDP tunnel, a forwarding table for the unique instance of the private connectivity service and the UDP destination port value.

In some example implementations, the unique instance of a private connectivity service is a virtual router and forwarder (VRF) instance.

In some example implementations, the act of allocating is based on a manual, user input. In some alternative implementations, the act of allocating is performed automatically, using an available and unallocated UDP destination port value. For example, the act of allocating may be performed dynamically, using either (A) a UDP-port-allocation library on the network device, or (B) a software-based management utility external to the network device.

Some example implementations further include: (c) advertising, by the network device at the egress of the IP over UDP tunnel to a network device at the ingress of the IP over UDP tunnel and belonging to the shared network, information associating (1) the UDP destination port value for the IP over UDP tunnel to (2) the unique instance of a private connectivity service. In at least some such implementations, the information associating (1) the UDP destination port value for the IP over UDP tunnel to (2) the unique instance of a private connectivity service is advertised through at least one service route belonging to the unique instance of the private connectivity service. In some example implementations, the advertisement is included in a BGP message. For example, the advertisement may be included in a tunnel encapsulation attribute (TEA) type-length value (TLV). As another example, the advertisement is included in an Address Family Identifier (AFI) and a Subsequent Address Family Identifier (SAFI).

Some example implementations may further include: (d) receiving, by the network device at the ingress of the IP over UDP tunnel, an IP packet associated with the unique instance of the private connectivity service; (e) encapsulating, by the network device at the ingress of the IP over UDP tunnel, the IP packet with an IP over UDP header to generate an IP-in-IP packet having (1) a UDP destination port field populated with the UDP destination port value, and (2) an IP destination field populated with an IP address of the network device at the egress of the IP over UDP tunnel; and (f) transmitting, by the network device at the ingress of the IP over UDP tunnel, the IP-in-IP packet. Some example implementations may further include (g) receiving, by the network device at the egress of the IP over UDP tunnel, the IP-in-IP packet; (h) decapsulating, by the network device at the egress of the IP over UDP tunnel, the IP-in-IP packet to expose the IP packet; (i) selecting, by the network device at the egress of the IP over UDP tunnel, one of a plurality of forwarding tables using a UDP destination port value in the received IP-in-IP packet; and (j) forwarding, by the network device at the egress of the IP over UDP tunnel, the IP packet using the one of the plurality of forwarding tables selected.

Some other example implementations may further include: (c) receiving, by the network device at the egress of the IP over UDP tunnel, an IP-in-IP packet; (d) decapsulating, by the network device at the egress of the IP over UDP tunnel, the IP-in-IP packet to expose an IP packet; (e) selecting, by the network device at the egress of the IP over UDP tunnel, one of a plurality of forwarding tables using a UDP destination port value in the received IP-in-IP packet; and (f) forwarding, by the network device at the egress of the IP over UDP tunnel, the IP packet using the one of the plurality of forwarding tables selected.

Still some other implementations may further include: (c) allocating, by the network device at the egress of a second IP over UDP tunnel, (1) a second UDP destination port value for the IP over UDP tunnel to (2) a second unique instance of a private connectivity service; and (d) associating, by the network device at the egress of the second IP over UDP tunnel, a second forwarding table for the second unique instance of the private connectivity service and the second UDP destination port value. In some such implementations, the second unique instance of a private connectivity service may be a second virtual router and forwarder (VRF) instance.

Some example network devices consistent with the present description (e.g., at the ingress and/or at the egress) include: (a) at least one processor; and (b) a non-transitory computer-readable storage medium storing processor-executable instructions, which, when executed by the at least one processor, cause the at least one processor to perform any of the methods described.

Some example implementations may further include a non-transitory computer readable storage medium storing processor executable instructions, which, when executed by at least one processor, cause the at least one processor to perform any of the methods described.

§ 3. BRIEF DESCRIPTION OF THE DRAWINGS

FIG. 2 illustrates a payload (e.g., an IP packet) encapsulated in an IP over UDP header in a manner consistent with the present description.

§ 4. DETAILED DESCRIPTION

The present disclosure may involve novel methods, apparatus, message formats, and/or data structures that identify different services through VRFs without needing an MPLS label or a VXLAN Network Identifier (VNI) using, for example, different UDP port numbers to identify different connectivity services (e.g., customers, VRFs) when IP-in-IP (also referred to as IP over UDP) is used as a tunneling mechanism (e.g., in the data center). The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

There are different tunnel mechanisms that can be used for the next generation DC that provides layer 3 only services, such as IP-in-IP or SRv6. Example embodiments consistent with the present description involve using a unique UDP port number for each VRF instance and mapping that UDP port number to its corresponding VRF at both ends of an IP over UDP tunnel. In the control plane, the egress PE may be used to allocate a locally unique UDP port value to each VRF from the non-standard UDP port range. Such a UDP port may be referred to as a "service UDP port." An egress PE may advertise the service route with its corresponding service UDP port based on the VRF it belongs to.

§ 4.1 EXAMPLE METHOD(S)

Figures 1A, 1B:
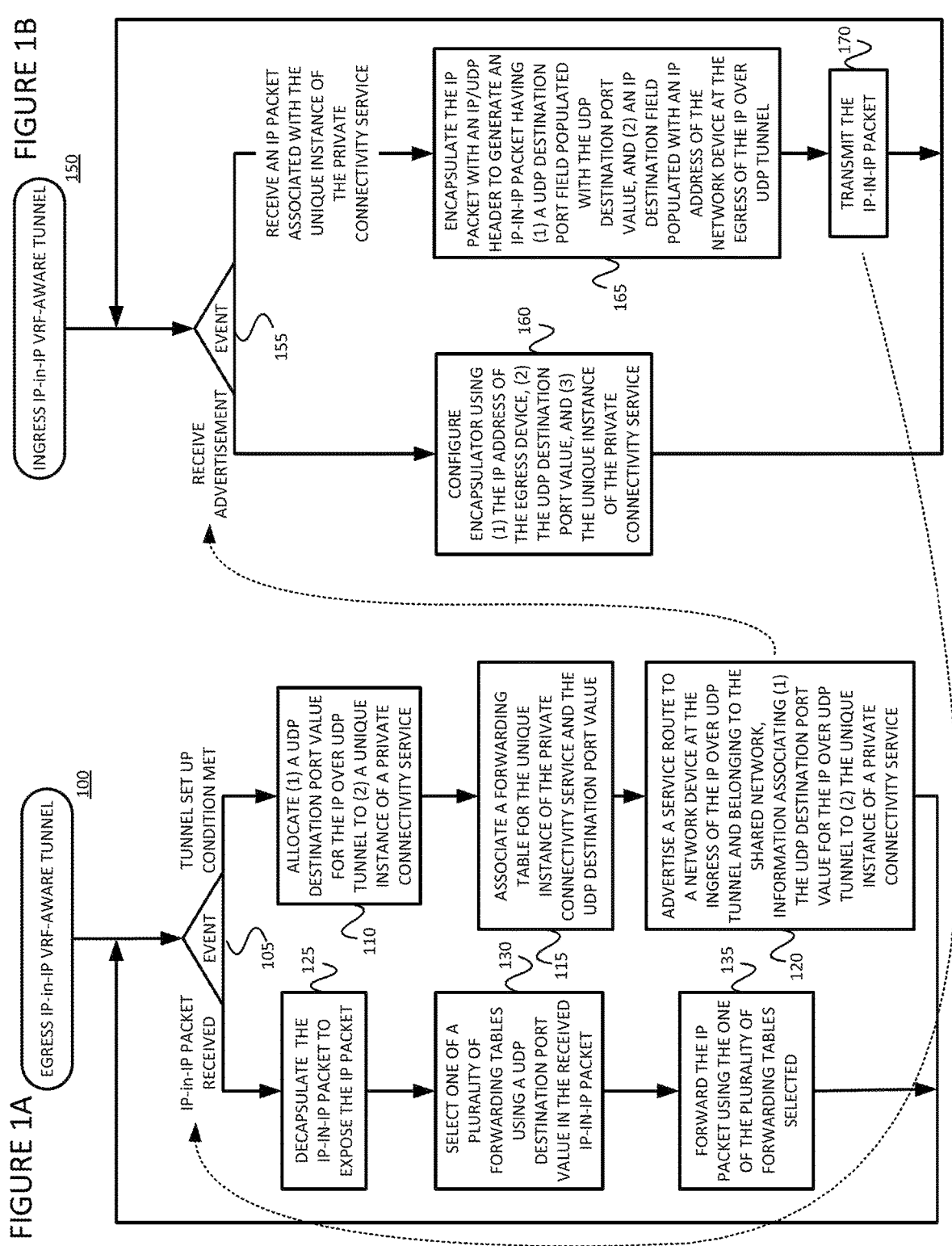
FIGS. 1A and 1B are example methods, consistent with the present application, that may be performed by devices at the egress and ingress, respectively, of an IP over UDP VRF-aware tunnel.

FIGS. 1A and 1B are example methods 100 and 150, respectively, consistent with the present description, that may be performed by devices at the egress and ingress, respectively, of an IP over UDP VRF-aware tunnel. In each case, different branches of the methods are executed responsive to the occurrence of different events. Each of the example methods 100 and 150 include acts related to configuring or setting up an IP over UDP tunnel, and acts related to forwarding data payload entering and exiting the IP over UDP tunnel.

Referring first to the example method 100 of FIG. 1A, responsive to a tunnel set up condition being met (right branch of Event 105), a network device at the egress of the IP over UDP tunnel allocates (1) a UDP destination port value for the IP over UDP tunnel to (2) a unique instance of a private connectivity service (Block 110), and associates a forwarding table for the unique instance of the private connectivity service and the UDP destination port value (Block 115). As will be described later, this may be used by a decapsulator and forwarding table selector for decapsulating and forwarding packets received on the IP over UDP tunnel. Further, the egress device advertises (e.g., a service route), to a network device at the ingress of the IP over UDP tunnel, information associating the UDP destination port value of the IP over UDP tunnel to the unique instance of the private connectivity service. (Block 120)

Referring next to the example method 150 of FIG. 1B, responsive to receiving the advertisement (left branch of Event 155), a network device at the ingress of the IP over UDP tunnel configures an encapsulator using information including (1) the IP address of the egress device, (2) the UDP destination port value, and (3) the unique instance of the private connectivity service. (Block 160) At this time, the IP over UDP tunnel is configured (or set up) and can forward data payloads.

Still referring to the example method 150 of FIG. 1B, responsive to receiving an IP packet associated with the unique instances of the private connectivity service (right branch of Event 155), the ingress device encapsulates the IP packet with an IP and UDP header to generate an IP-in-IP packet having (1) a UDP destination port field populated with the UDP destination port value, and (2) an IP destination field populated with an IP address of the network device at the egress of the IP over UDP tunnel (Block 165), and transmits the IP-in-IP packet (Block 170).

Finally, referring to the example method 100 of FIG. 1A, responsive to receiving, by the network device at the egress of the IP over UDP tunnel, the IP-in-IP packet (left branch of Event 105), the egress device decapsulates the IP-in-IP packet to expose the IP packet (Block 125), selects one of a plurality of forwarding tables using a UDP destination port value in the received IP-in-IP packet (Block 130), and forwards the IP packet using the one of the plurality of forwarding tables selected (Block 135).

In some example implementations of the example methods 110 and 150, the unique instance of a private connectivity service is a virtual router and forwarder (VRF) instance.

Referring back to the right branch of Event 105, in some example implementations, the tunnel set up condition is the receipt of manual, user input, and the act of allocating (Block 110) uses the manual user input. In other implementations, the act of allocating (Block 110) is performed automatically, using an available and unallocated UDP destination port value. In other implementations, the act of allocating (Block 110) is performed dynamically, using either (A) a UDP-port-allocation library on the network device, or (B) a software-based management utility external to the network device. In these cases, the tunnel set up condition might be the receipt of a command from an external device, the receipt of a command via a user interface, and/or triggered by a condition in a program running on the egress device.

Referring back to block 120 of FIG. 1A, in some implementations, the information associating (1) the UDP destination port value for the IP over UDP tunnel to (2) the unique instance of a private connectivity service is advertised through at least one service route belonging to the unique instance of the private connectivity service. In some implementations, the advertisement is included in a BGP message. (See, e.g., E. Rosen, et al, "BGP/MPLS IP Virtual Private Networks (VPNs)," *Request for Comments (RFC)*: 4364 (Internet Engineering Task Force (IETF), February 2006 (referred to as "RFC 4364," incorporated herein by referenced), BGP within service provider network.) For example, the advertisement (or information in the advertisement) may be included in a tunnel encapsulation attribute (TEA) type-length value (TLV). (See, e.g., the document, K. Patel, et al., "The BGP Tunnel Encapsulation Attribute," *Request for Comments (RFC)* 9012 (Internet Engineering Task Force (IETF), April 2021) (referred to as "RFC 9012" and incorporated herein by reference).) As another example, the advertisement (or information in the advertisement) may be included in an Address Family Identifier (AFI) and a Subsequent Address Family Identifier (SAFI).

Note that the example methods 100 and 150 may be executed a number of times for a number of different unique instances of a private connectivity services (e.g., for a number of unique VRFs).

Referring back to blocks 165 and 170 of FIG. 1B, FIG. 2 illustrates a payload (e.g., an IP packet) 210 encapsulated in an IP over UDP header 220 and 230. In this example data structure 200, a value in the destination port number field 225 of the UDP header 220 is allocated to, and associated with, the unique instance of the private connectivity service. (Recall block 110 of FIG. 1A.) Further, in this example data structure 200, a value in the destination address field 235 of the IP header 230 corresponds to the IP address of the device at the egress of the IP over UDP tunnel. The IP destination address is used to forward the packet to the egress device. The protocol field 237 in the outer IP header 230 is set to 17 for UDP Datagram Protocol. The value in the destination port number field 225 is used by the egress device to know which customer or connectivity service the underlying payload (e.g., IP packet) is for.

Note that the UDP destination port number need not be globally unique; it just needs to be unique to the egress device (that is, locally unique). However, if UDP destination port numbers are not unique to unique VRFs, some coordination may be useful in the case of dual-homing or multi-homing devices.

Note further that the egress device can interpret UDP destination port value anyway it sees fit.

As should be appreciated from the foregoing, for an overlay IP over UDP tunnel in the data plane, the destination UDP port value in the outer IP header will be set to the service UPD associated with the service route it learned from its egress device. At the egress device, the outer UDP destination port will be used to identify its VRF.

§ 4.2 EXAMPLE OPERATION(S) OF EXAMPLE METHOD(S)

Figure 3A:
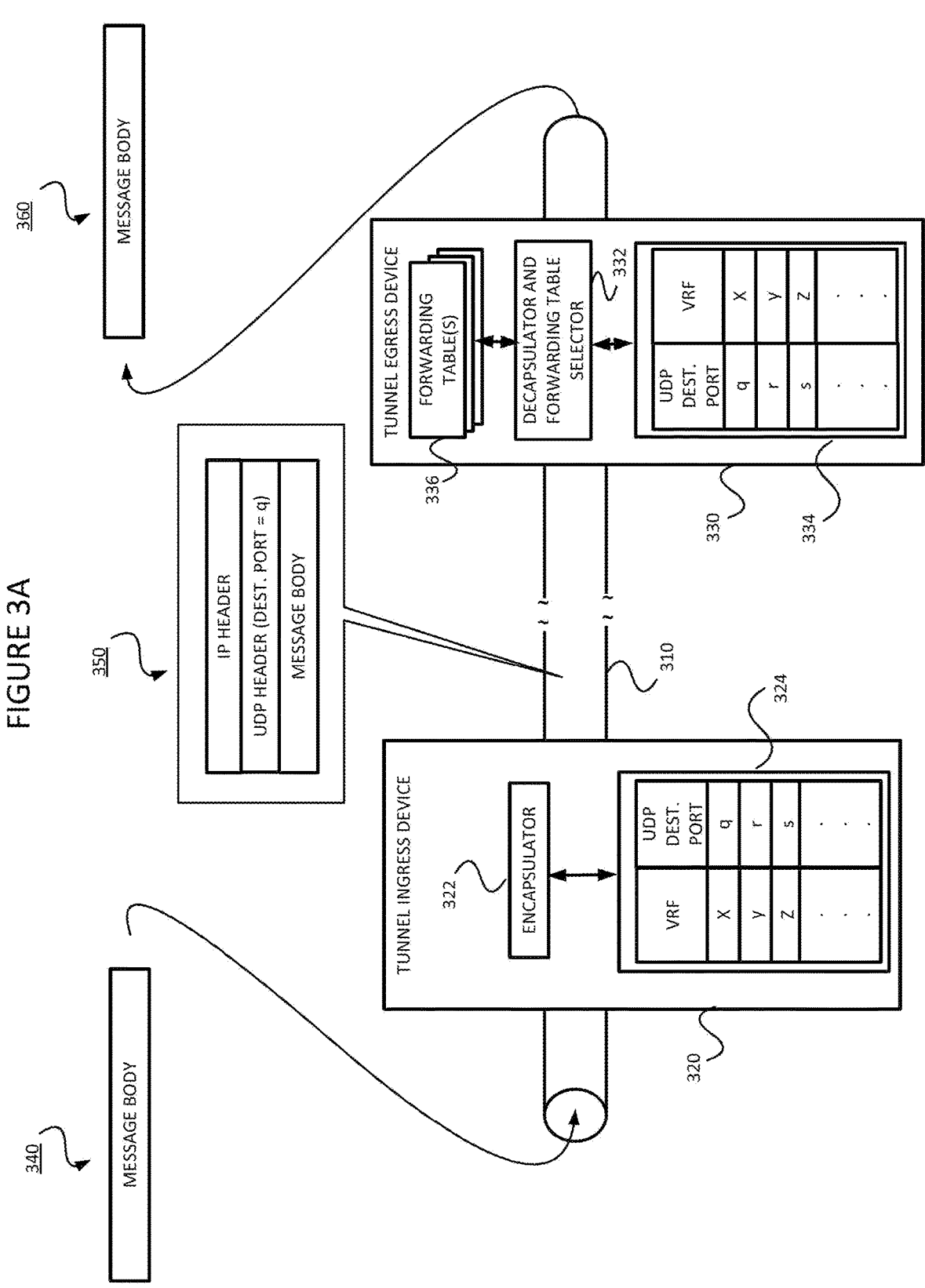
FIGS. 3A and 3B illustrate packet forwarding over an IP over UDP tunnel for different VRFs.
Figure 3B:
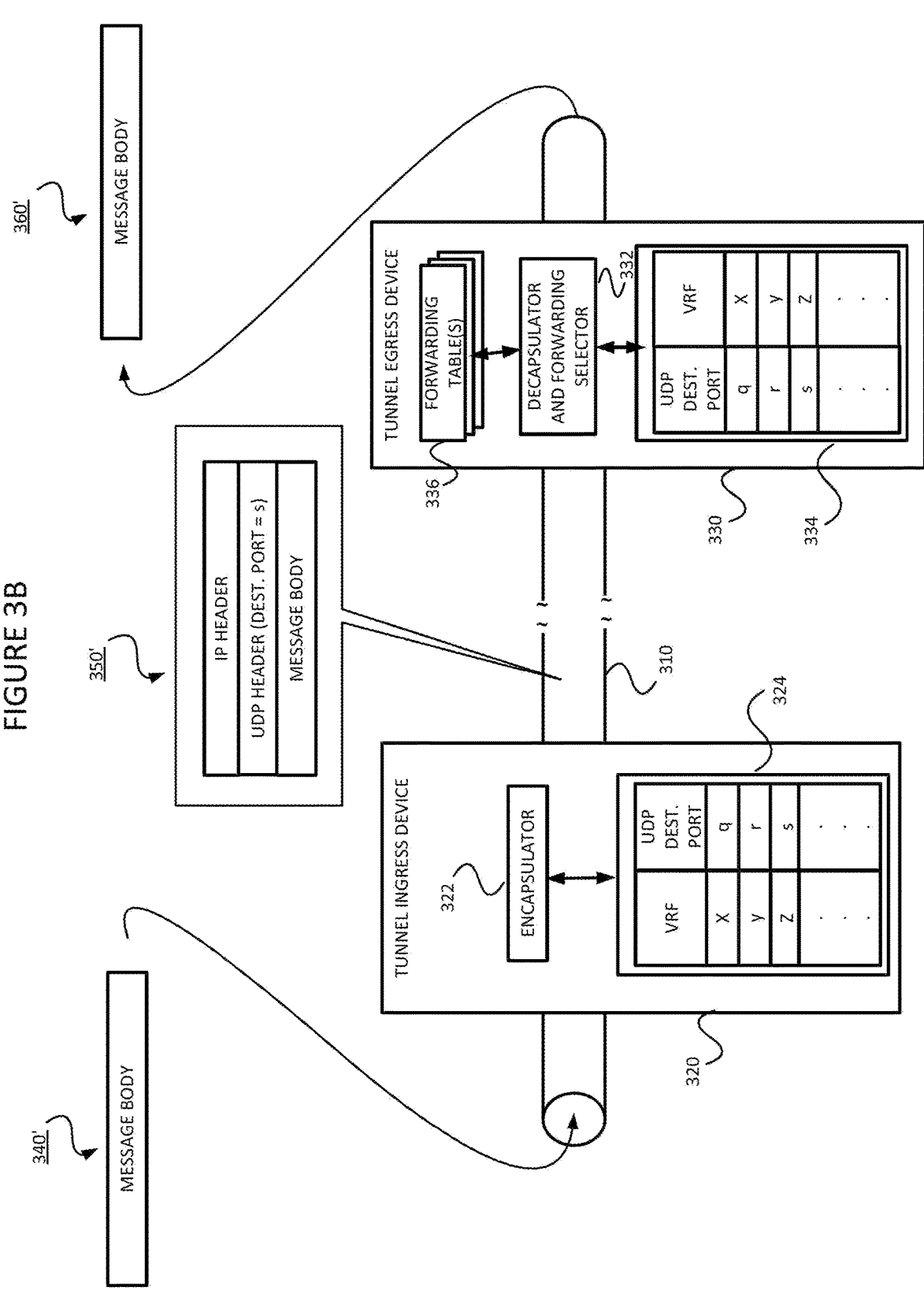

FIGS. 3A and 3B illustrate data plane handling of messages of different VRFs at the ingress and egress of an IP over UPD tunnel(s). The IP over UDP tunnel 310 includes a tunnel ingress device 320 and a tunnel egress device 330. There may be zero of more transit devices (not shown) on the IP over UPD tunnel 310 between the tunnel ingress device 320 and the tunnel egress device 330. The tunnel ingress device 320 includes, among other things, an encapsulator 322 and a storage device or memory 324 storing an association of one or more VRF identifiers and UDP destination port numbers. The tunnel egress device 330 includes, among other things, a decapsulator and (e.g., per VRF) forwarding table selector 332, a storage device or memory 334 storing an association of one or more UDP destination port numbers and VRFs, and one or more forwarding tables 336. As should be appreciated, this example assumes that forwarding state has been programmed on the tunnel ingress device 320 and a decapsulator and forwarding table selector 336 has been programmed on the tunnel egress device 330. Note that in this example, the UDP destination port numbers are depicted with lower case letters (q, r, s, . . . ) for simplicity of illustration. In practice, the destination port number values should be in the range of 49512 to 65535.

Referring first to FIG. 3A, a message 340 for VRF X arrives at the tunnel ingress device 320. The encapsulator 322 uses the VRF to look up a corresponding UDP destination port number. In this example, the UDP destination port number "q" is associated with VRF "X". The message 350 output from the tunnel ingress device 320 corresponds to the original message 340 encapsulated with a UDP header in which the value in the UDP destination port number field 225 is set to "q" and an IP header with a protocol field 237 set to "17" for UDP Datagram Protocol and the value in the destination address field 235 set to the IP address of the egress device 330. (Recall, e.g., block 165 of FIG. 1B.) (Note that the UDP source port may be provided with an entropy value for load balancing (though this is not required), and the other UDP header fields may be populated in a conventional or in a proprietary manner.) The message 350 may be forwarded over zero or more transit devices (not shown) on the IP over UDP tunnel 310. (Recall, e.g., block 170 of FIG. 1B.) When the message 350 arrives at the tunnel egress device 330, the decapsulator and forwarding table selector 332 uses the value "q" in the UDP destination port number field 225 to lookup the VRF (in this case "X") and to select the appropriate forwarding table 336 for VRF "X". The decapsulated message body 360 is output from the tunnel egress device 330. (Recall, e.g., block 135 of FIG. 1A.)

Referring next to FIG. 3B, a message 340' for VRF Z arrives at the tunnel ingress device 320. The encapsulator 322 uses the VRF to look up a corresponding UDP desti-nation port number. In this example, the UDP destination port number "s" is associated with VRF "Z". The message 350' output from the tunnel ingress device 320 corresponds to the original message 340' encapsulated with a UDP header in which the value of the UDP destination port number field 225 is set to "s" and an IP header with a protocol field 237 set to "17" for UDP Datagram Protocol and a value in the destination address field 235 set to the IP address of the egress device 330. (Recall, e.g., block 165 of FIG. 1B.) (Note that the UDP source port may be provided with an entropy value (though this is not required), and the other UDP header fields may be populated in a conventional or in a proprietary manner.) The message 350' may be forwarded over zero or more transit devices (not shown) on the IP over UDP tunnel 310. (Recall, e.g., block 170 of FIG. 1B.) When the message 350' arrives at the tunnel egress device 330, the decapsulator and forwarding table selector 332 uses the value "s" in the UDP destination port number field 225 to lookup the VRF (in this case "Z") and to select the appropriate forwarding table 336 for VRF "Z". The decapsulated message body 360' is output from the tunnel egress device 330. (Recall, e.g., block 135 of FIG. 1A.)

§ 4.3 EXAMPLE APPARATUS

Figure 4:
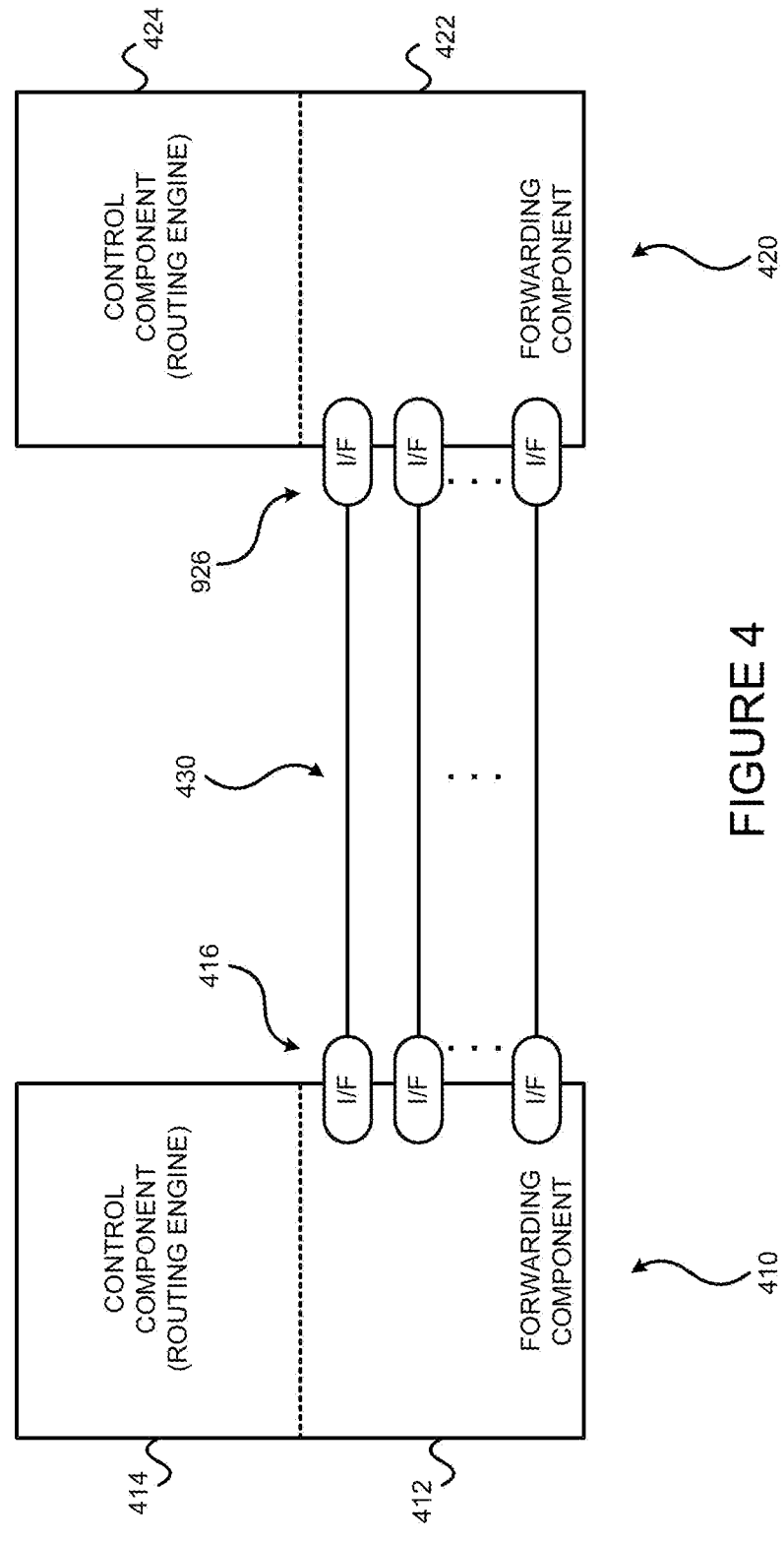
FIG. 4 illustrates two data forwarding systems, which may be used as nodes, coupled via communications links, in a communications network, such as communications network supporting IP over UDP VRF-aware tunnel.

The data communications network nodes (e.g., the ingress and/or egress nodes of an IP over UDP tunnel tunnel) may be forwarding devices, such as routers for example. FIG. 4 illustrates two data forwarding systems 410 and 420 coupled via communications links 430. The links may be physical links or "wireless" links. The data forwarding systems 410,420 may be routers for example. If the data forwarding systems 410,420 are example routers, each may include a control component (e.g., a routing engine) 414,424 and a forwarding component 412,422. Each data forwarding system 410,420 includes one or more interfaces 416,426 that terminate one or more communications links 430.

As just discussed above, and referring to FIG. 5, some example routers 500 include a control component (e.g., routing engine) 510 and a packet forwarding component (e.g., a packet forwarding engine) 590.

The control component 510 may include an operating system (OS) kernel 520, routing protocol process(es) 530, label-based forwarding protocol process(es) 540, interface process(es) 550, user interface (e.g., command line interface) process(es) 560, and chassis process(es) 570, and may store routing table(s) 539, label forwarding information 545, and forwarding (e.g., route-based and/or label-based) table(s) 580. As shown, the routing protocol process(es) 530 may support routing protocols such as the routing information protocol ("RIP") 531, the intermediate system-to-intermediate system protocol ("IS-IS") 532, the open shortest path first protocol ("OSPF") 533, the enhanced interior gateway routing protocol ("EIGRP") 534 and the border gateway protocol ("BGP") 535, and the label-based forwarding protocol process(es) 540 may support protocols such as BGP 535, the label distribution protocol ("LDP") 536, the resource reservation protocol ("RSVP") 537, EVPN 538 and L2VPN 539. Other protocols may be supported. One or more components (not shown) may permit a user 565 to interact with the user interface process(es) 560. Similarly, one or more components (not shown) may permit an outside device (not shown) to interact with one or more of the router protocol process(es) 530, the label-based forwarding protocol process(es) 540, the interface process(es) 550, and the chassis process(es) 570, via SNMP 585, and such processes may send information to an outside device via SNMP 585.

The packet forwarding component 590 may include a microkernel 592 over hardware components (e.g., ASICs, switch fabric, optics, etc.) 591, interface process(es) 593, ASIC drivers 594, chassis process(es) 595 and forwarding (e.g., route-based and/or label-based) table(s) 596.

Figure 5:
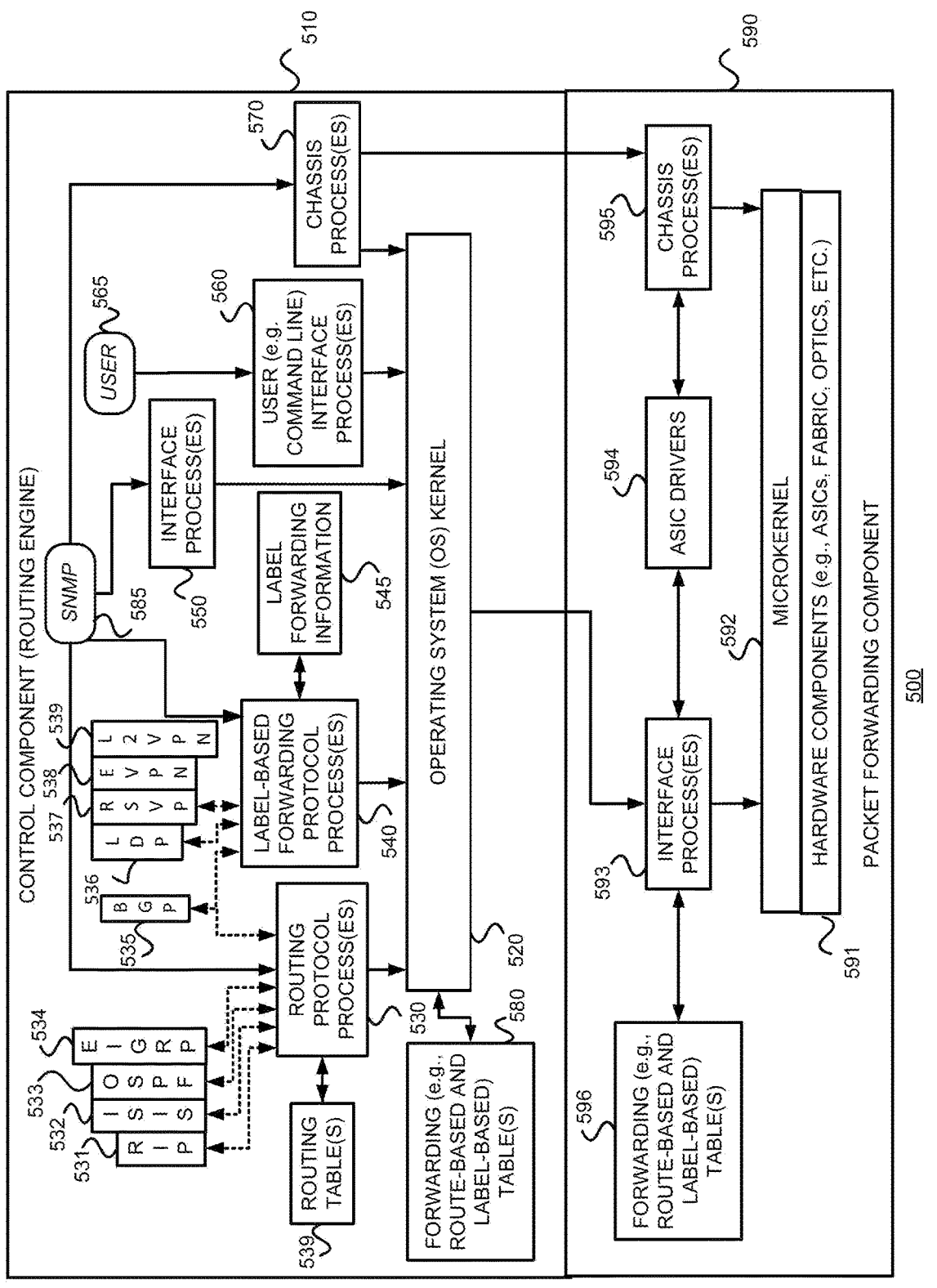
FIG. 5 is a block diagram of a router which may be used a communications network, such as communications network supporting IP over UDP VRF-aware tunnel(s).

In the example router 500 of FIG. 5, the control component 510 handles tasks such as performing routing protocols, performing label-based forwarding protocols, control packet processing (such as advertisements, as discussed above), etc., which frees the packet forwarding component 590 to forward received packets quickly. That is, received control packets (e.g., routing protocol packets and/or label-based forwarding protocol packets) are not fully processed on the packet forwarding component 590 itself, but are passed to the control component 510, thereby reducing the amount of work that the packet forwarding component 590 has to do and freeing it to process packets to be forwarded efficiently. Thus, the control component 510 is primarily responsible for running routing protocols and/or label-based forwarding protocols, maintaining the routing tables and/or label forwarding information, sending forwarding table updates to the packet forwarding component 590, and performing system management. The example control component 510 may handle routing protocol packets, provide a management interface, provide configuration management, perform accounting, and provide alarms. The processes 530, 540, 550, 560 and 570 may be modular, and may interact with the OS kernel 520. That is, nearly all of the processes communicate directly with the OS kernel 520. Using modular software that cleanly separates processes from each other isolates problems of a given process so that such problems do not impact other processes that may be running. Additionally, using modular software facilitates easier scaling.

Still referring to FIG. 5, the example OS kernel 520 may incorporate an application programming interface ("API") system for external program calls and scripting capabilities. The control component 510 may be based on an Intel PCI platform running the OS from flash memory, with an alternate copy stored on the router's hard disk. The OS kernel 520 is layered on the Intel PCI platform and establishes communication between the Intel PCI platform and processes of the control component 510. The OS kernel 520 also ensures that the forwarding tables 596 in use by the packet forwarding component 590 are in sync with those 580 in the control component 510. Thus, in addition to providing the underlying infrastructure to control component 510 software processes, the OS kernel 520 also provides a link between the control component 510 and the packet forwarding component 590.

Referring to the routing protocol process(es) 530 of FIG. 5, this process(es) 530 provides routing and routing control functions within the platform. In this example, the RIP 531, ISIS 532, OSPF 533 and EIGRP 534 (and BGP 535) protocols are provided. Naturally, other routing protocols may be provided in addition, or alternatively. Similarly, the label-based forwarding protocol process(es) 540 provides label forwarding and label control functions. In this example, the LDP 536, RSVP 537, EVPN 538 and L2VPN 539 (and BGP 535) protocols are provided. Naturally, other label-based forwarding protocols (e.g., MPLS, SR, etc.) may be provided in addition, or alternatively. In the example router 500, the routing table(s) 539 is produced by the routing protocol process(es) 530, while the label forwarding information 545 is produced by the label-based forwarding protocol process(es) 540.

Still referring to FIG. 5, the interface process(es) 550 performs configuration of the physical interfaces and encapsulation.

The example control component 510 may provide several ways to manage the router. For example, it 510 may provide a user interface process(es) 560 which allows a system operator 565 to interact with the system through configuration, modifications, and monitoring. The SNMP 585 allows SNMP-capable systems to communicate with the router platform. This also allows the platform to provide necessary SNMP information to external agents. For example, the SNMP 585 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 510, thereby avoiding slowing traffic forwarding by the packet forwarding component 590.

Although not shown, the example router 500 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 560 via a console port, an auxiliary port, and/or a management Ethernet port.

The packet forwarding component 590 is responsible for properly outputting received packets as quickly as possible. If there is no entry in the forwarding table for a given destination or a given label and the packet forwarding component 590 cannot perform forwarding by itself, it 590 may send the packets bound for that unknown destination off to the control component 510 for processing. The example packet forwarding component 590 is designed to perform Layer 2 and Layer 3 switching, route lookups, and rapid packet forwarding.

As shown in FIG. 5, the example packet forwarding component 590 has an embedded microkernel 592 over hardware components 591, interface process(es) 593, ASIC drivers 594, and chassis process(es) 595, and stores a forwarding (e.g., route-based and/or label-based) table(s) 596. (Recall, e.g., 336 of FIGS. 3A and 3B.) The microkernel 592 interacts with the interface process(es) 593 and the chassis process(es) 595 to monitor and control these functions. The interface process(es) 592 has direct communication with the OS kernel 520 of the control component 510. This communication includes forwarding exception packets and control packets to the control component 510, receiving packets to be forwarded, receiving forwarding table updates, providing information about the health of the packet forwarding component 590 to the control component 510, and permitting configuration of the interfaces from the user interface (e.g., CLI) process(es) 560 of the control component 510. The stored forwarding table(s) 596 is static until a new one is received from the control component 510. The interface process(es) 593 uses the forwarding table(s) 596 to look up next-hop information. The interface process(es) 593 also has direct communication with the distributed ASICs. Finally, the chassis process(es) 595 may communicate directly with the microkernel 592 and with the ASIC drivers 594.

Figure 6:
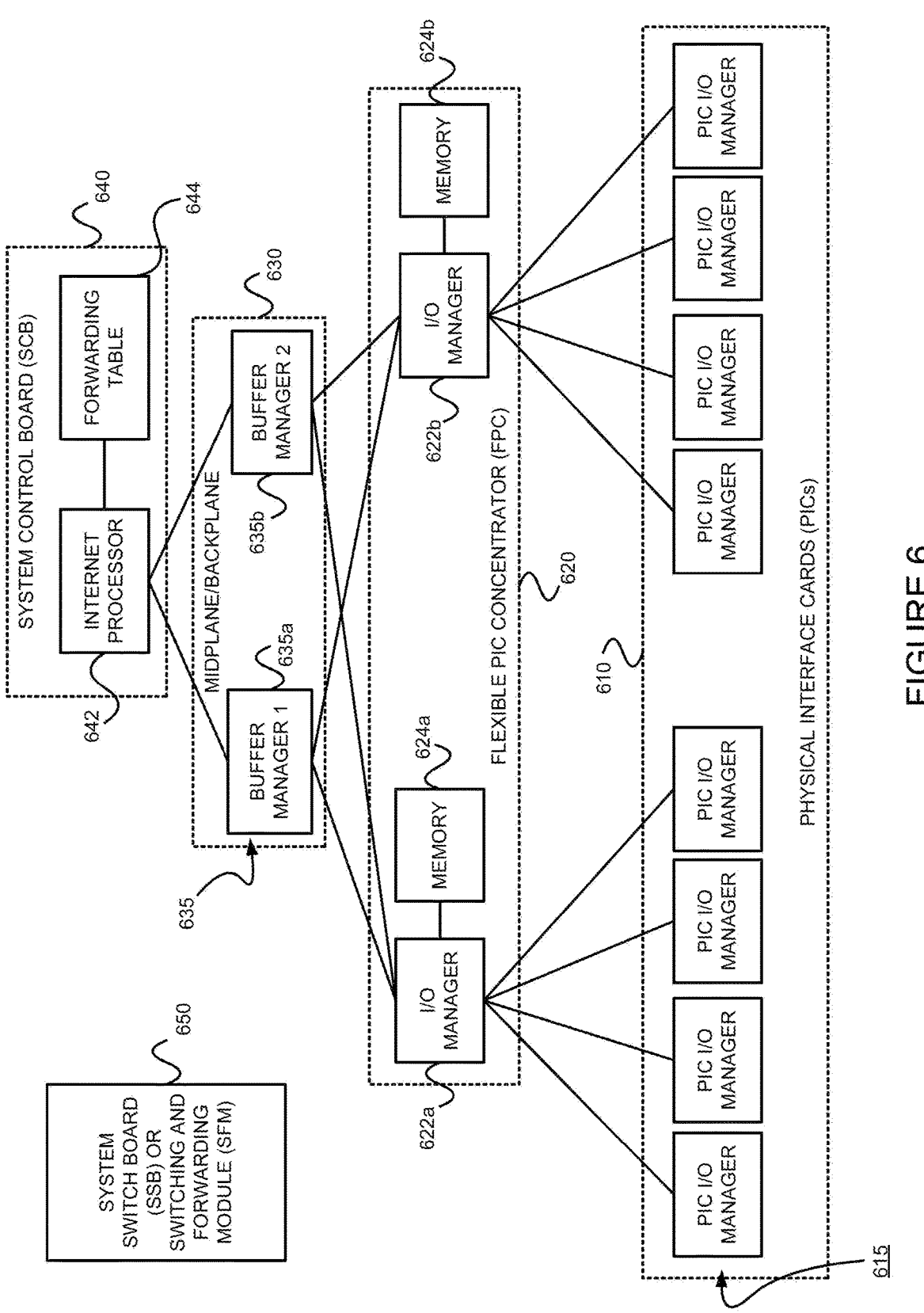
FIG. 6 is an example architecture in which ASICS may be distributed in a packet forwarding component to divide the responsibility of packet forwarding.
Figures 7A, 7B:
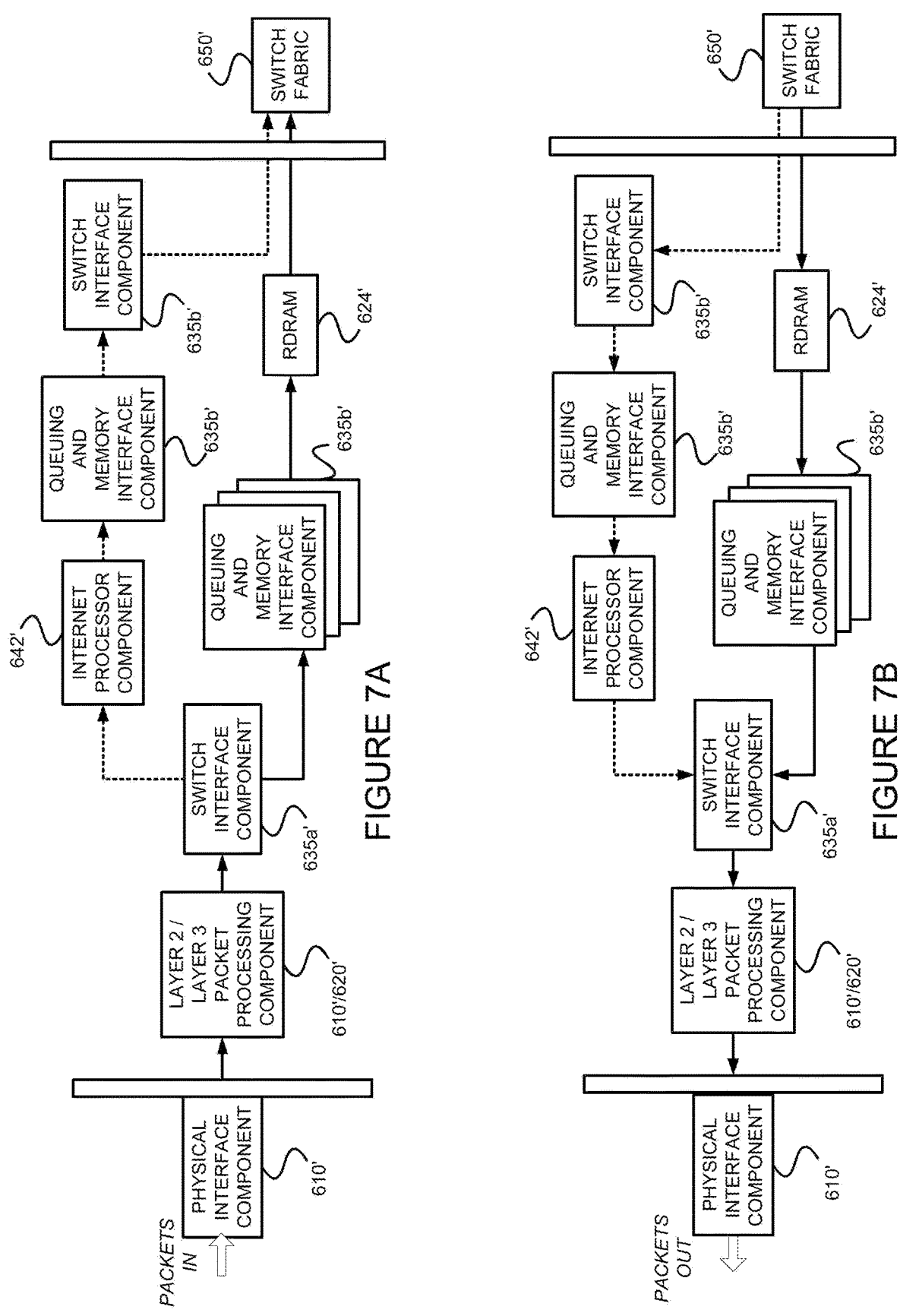
FIGS. 7A and 7B is an example of operations of the example architecture of FIG. 6.

FIG. 6 is an example of how the ASICS may be distributed in the packet forwarding component 590 to divide the responsibility of packet forwarding. As shown in FIG. 6, the ASICs of the packet forwarding component 590 may be distributed on physical interface cards ("PICs") 610, flexible PIC concentrators ("FPCs") 620, a midplane or backplane 630, and a system control board(s) 640 (for switching and/or forwarding). Switching fabric is also shown as a system switch board ("SSB"), or a switching and forwarding module ("SFM") 650 (which may be a switch fabric 650' as shown in FIGS. 7A and 7B). Each of the PICs 610 includes one or more PIC I/O managers 615. Each of the FPCs 620 includes one or more I/O managers 622, each with an associated memory 624 (which may be a RDRAM 624' as shown in FIGS. 7A and 7B). The midplane/backplane 630 includes buffer managers 635a, 635b. Finally, the system control board 640 includes an internet processor 642 and an instance of the forwarding table 644 (Recall, e.g., 596 of FIG. 5).

Still referring to FIG. 6, the PICs 610 contain the interface ports. Each PIC 610 may be plugged into an FPC 620. Each individual PIC 610 may contain an ASIC that handles media-specific functions, such as framing or encapsulation. Some example PICs 610 provide SDH/SONET, ATM, Gigabit Ethernet, Fast Ethernet, and/or DS3/E3 interface ports.

An FPC 620 can contain one or more PICs 610, and may carry the signals from the PICS 610 to the midplane/backplane 630 as shown in FIG. 6.

The midplane/backplane 630 holds the line cards. The line cards may connect into the midplane/backplane 630 when inserted into the example router's chassis from the front. The control component (e.g., routing engine) 510 may plug into the rear of the midplane/backplane 630 from the rear of the chassis. The midplane/backplane 630 may carry electrical (or optical) signals and power to each line card and to the control component 510.

The system control board 640 may perform forwarding lookup. It 640 may also communicate errors to the routing engine. Further, it 640 may also monitor the condition of the router based on information it receives from sensors. If an abnormal condition is detected, the system control board 640 may immediately notify the control component 510.

Referring to FIGS. 6, 7A and 7B, in some exemplary routers, each of the PICs 610,610' contains at least one I/O manager ASIC 615 responsible for media-specific tasks, such as encapsulation. The packets pass through these I/O ASICs on their way into and out of the router. The I/O manager ASIC 615 on the PIC 610,610' is responsible for managing the connection to the I/O manager ASIC 622 on the FPC 620,620', managing link-layer framing and creating the bit stream, performing cyclical redundancy checks (CRCs), and detecting link-layer errors and generating alarms, when appropriate. The FPC 620 includes another I/O manager ASIC 622. This ASIC 622 (shown as a layer 2/layer 3 packet processing component 610'/620') takes the packets from the PICs 610 and breaks them into (e.g., 74-byte) memory blocks. This FPC I/O manager ASIC 622 (shown as a layer 2/layer 3 packet processing component 610'/620') sends the blocks to a first distributed buffer manager (DBM) 635a (shown as switch interface component 635a'), decoding encapsulation and protocol-specific information, counting packets and bytes for each logical circuit, verifying packet integrity, and applying class of service (CoS) rules to packets. At this point, the packet is first written to memory. More specifically, the example DBM ASIC 635/635a' manages and writes packets to the shared memory 624 across all FPCs 620. In parallel, the first DBM ASIC 635/635a' also extracts information on the destination of the packet and passes this forwarding-related information to the Internet processor 642/642'. The Internet processor 642/642' performs the route lookup using the forwarding table 644 and sends the information over to a second DBM ASIC 635b'. The Internet processor ASIC 642/642' also collects exception packets (i.e., those without a forwarding table entry) and sends them to the control component 510. The second DBM ASIC 625 (shown as a queuing and memory interface component 635b') then takes this information and the 74-byte blocks and forwards them to the I/O manager ASIC 622 of the egress FPC 620/620' (or multiple egress FPCs, in the case of multicast) for reassembly. (Thus, the DBM ASICs 635a/635a' and 635b/635b' are responsible for managing the packet memory 624/624' distributed across all FPCs 620/620', extracting forwarding-related information from packets, and instructing the FPC where to forward packets.)

The I/O manager ASIC 622 on the egress FPC 620/620' may perform some value-added services. In addition to incrementing time to live ("TTL") values and re-encapsulating the packet for handling by the PIC 610, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 622 on the egress FPC 620/620' may be responsible for receiving the blocks from the second DBM ASIC 635/635', incrementing TTL values, queuing a pointer to the packet, if necessary, before applying CoS rules, re-encapsulating the blocks, and sending the encapsulated packets to the PIC I/O manager ASIC 615.

Figure 8:
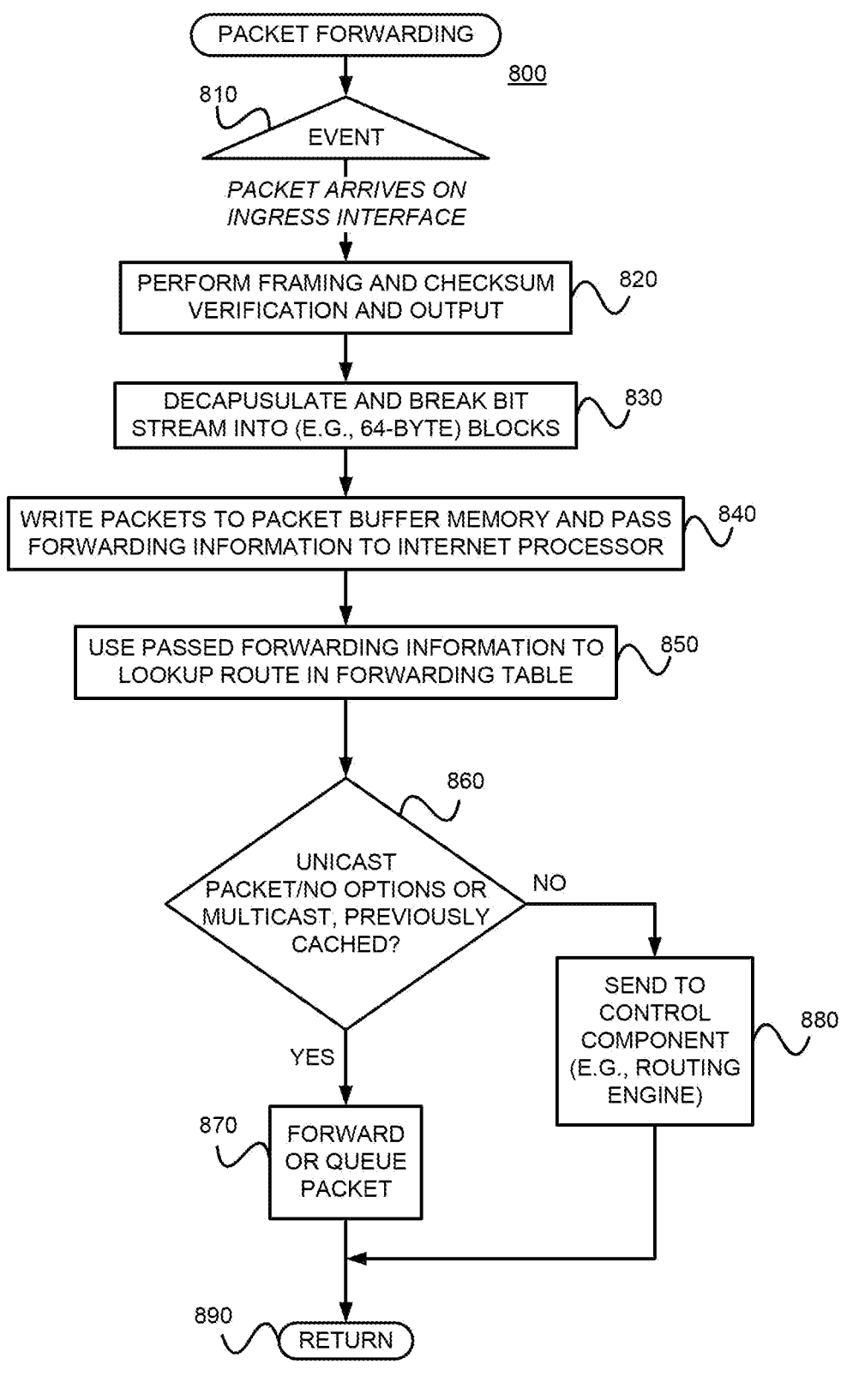
FIG. 8 is a flow diagram of an example method for providing packet forwarding in an example router.

FIG. 8 is a flow diagram of an example method 800 for providing packet forwarding in the example router. The main acts of the method 800 are triggered when a packet is received on an ingress (incoming) port or interface. (Event 810) The types of checksum and frame checks that are required by the type of medium it serves are performed and the packet is output, as a serial bit stream. (Block 820) The packet is then decapsulated and parsed into (e.g., 64-byte) blocks. (Block 830) The packets are written to buffer memory and the forwarding information is passed on the Internet processor. (Block 840) The passed forwarding information is then used to lookup a route in the forwarding table. (Block 850) Note that the forwarding table can typically handle unicast packets that do not have options (e.g., accounting) set, and multicast packets for which it already has a cached entry. Thus, if it is determined that these conditions are met (YES branch of Decision 860), the packet forwarding component finds the next hop and egress interface, and the packet is forwarded (or queued for forwarding) to the next hop via the egress interface (Block 870) before the method 800 is left (Node 890) Otherwise, if these conditions are not met (NO branch of Decision 860), the forwarding information is sent to the control component 510 for advanced forwarding resolution (Block 880) before the method 800 is left (Node 890).

Referring back to block 870, the packet may be queued. Actually, as stated earlier with reference to FIG. 6, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 622 may send a request for the packet to the second DBM ASIC 635b. The DBM ASIC 635 reads the blocks from shared memory and sends them to the I/O manager ASIC 622 on the FPC 620, which then serializes the bits and sends them to the media-specific ASIC of the egress interface. The I/O manager ASIC 615 on the egress PIC 610 may apply the physical-layer framing, perform the CRC, and send the bit stream out over the link.

Referring back to block 880 of FIG. 8, as well as FIG. 6, regarding the transfer of control and exception packets, the system control board 640 handles nearly all exception packets. For example, the system control board 640 may pass exception packets to the control component 510.

Although example embodiments consistent with the present description may be implemented on the example routers of FIG. 4 or 5, embodiments consistent with the present description may be implemented on communications network nodes (e.g., routers, switches, etc.) having different architectures. More generally, embodiments consistent with the present description may be implemented on an example system 900 as illustrated on FIG. 9.

Figure 9:
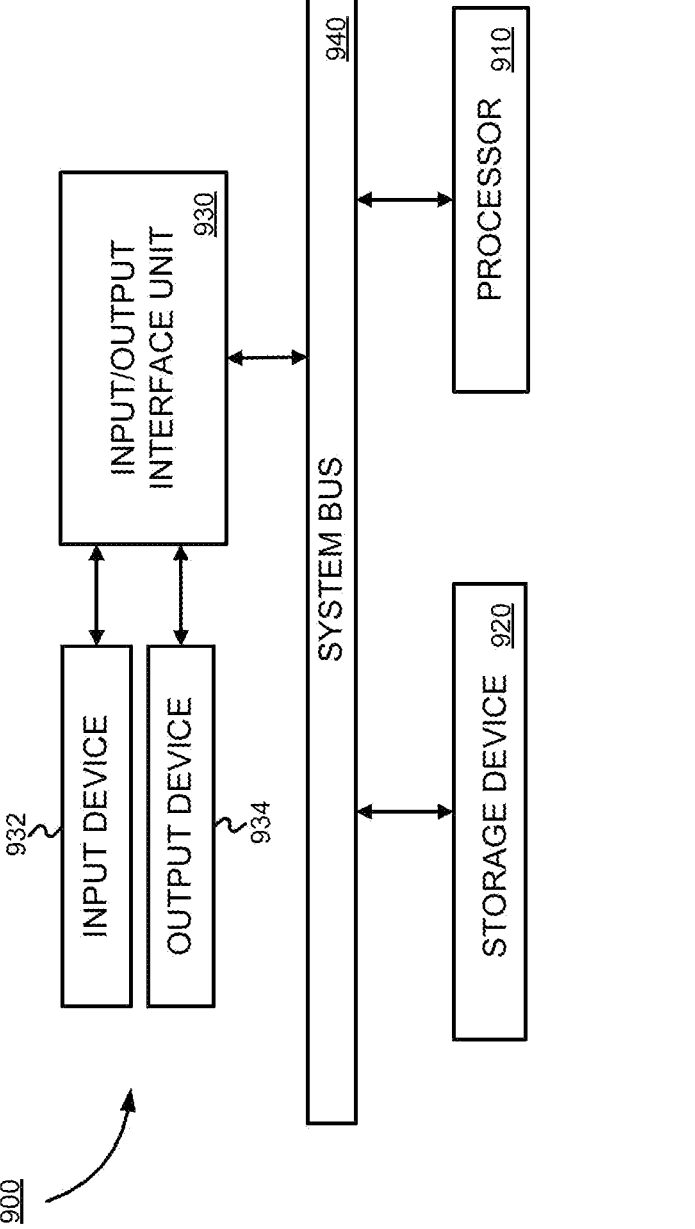
FIG. 9 is a block diagram of an exemplary machine that may perform one or more of the processes described, and/or store information used and/or generated by such processes.

FIG. 9 is a block diagram of an exemplary machine 900 that may perform one or more of the processes described, and/or store information used and/or generated by such processes. The exemplary machine 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930. The one or more processors 910 may execute machine-executable instructions (e.g., C or C++ running on the Linux operating system widely available from a number of vendors) to perform one or more aspects of the present description. At least a portion of the machine executable instructions may be stored (temporarily or more permanently) on the one or more storage devices 920 and/or may be received from an external source via one or more input interface units 930. The machine executable instructions may be stored as various software modules, each module performing one or more operations. Functional software modules are examples of components of the present description.

In some embodiments consistent with the present description, the processors 910 may be one or more microprocessors and/or ASICs. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.4 CONCLUSIONS

Example embodiments described above use different UDP port numbers to identify different connectivity services, customers, and/or VRFs (e.g., in a DC environment) using IP over UDP as the tunneling mechanism. This innovative approach provides multi-tenancy without using MPLS or MPLS over "X" encapsulation in the overlay. It improves scalability and reduces the overhead associated with using different destination IP address to identify different VRFs at the egress, thus making it a desirable option for next-generation data centers that provide layer 3 services. This is more scalable than using different IP-loopback addresses to distinguish different VRFs. It also avoids extra headers, and therefore avoids extra work in the forwarding plane.

What is claimed is:

1. A computer-implemented method comprising:
   a) allocating, by a network device at the egress of an Internet Protocol (IP) over User Datagram Protocol (UDP) tunnel and belonging to a shared network, (1) a UDP destination port value for the IP over UDP tunnel to (2) a unique instance of a private connectivity service;
   b) associating, by the network device at the egress of the IP over UDP tunnel, a forwarding table for the unique instance of the private connectivity service and the UDP destination port value; and
   c) advertising, by the network device at the egress of the IP over UDP tunnel to a network device at the ingress of the IP over UDP tunnel and belonging to the shared network, information associating (1) the UDP destination port value for the IP over UDP tunnel to (2) the unique instance of a private connectivity service, wherein the advertisement is included in a Border Gateway Protocol (BGP) message, and
   wherein the unique instance of a private connectivity service is a virtual router and forwarder (VRF) instance.

2. The computer implemented method of claim 1, wherein the act of allocating is based on a manual, user input.

3. The computer-implemented method of claim 1, wherein the act of allocating is performed automatically, using an available and unallocated UDP destination port value.

4. The computer-implemented method of claim 3, wherein the act of allocating is performed dynamically, using either (A) a UDP-port-allocation library on the network device, or (B) a software-based management utility external to the network device.

5. The computer-implemented method of claim 1, wherein the information associating (1) the UDP destination port value for the IP over UDP tunnel to (2) the unique instance of a private connectivity service is advertised through at least one service route belonging to the unique instance of the private connectivity service.

6. The computer-implemented method of claim 1 wherein the advertisement is included in a tunnel encapsulation attribute (TEA) type-length value (TLV).

7. The computer-implemented method of claim 1 wherein the advertisement is included in an Address Family Identifier (AFI) and a Subsequent Address Family Identifier (SAFI).

8. The computer-implemented method of claim 1, further comprising:

d) receiving, by the network device at the ingress of the IP over UDP tunnel, an IP packet associated with the unique instance of the private connectivity service;

e) encapsulating, by the network device at the ingress of the IP over UDP tunnel, the IP packet with an IP over UDP header to generate an IP-in-IP packet having (1) a UDP destination port field populated with the UDP destination port value, and (2) an IP destination field populated with an IP address of the network device at the egress of the IP over UDP tunnel; and f) transmitting, by the network device at the ingress of the IP over UDP tunnel, the IP-in-IP packet.

9. The computer-implemented method of claim 8, further comprising:

g) receiving, by the network device at the egress of the IP over UDP tunnel, the IP-in-IP packet;

h) decapsulating, by the network device at the egress of the IP over UDP tunnel, the IP-in-IP packet to expose the IP packet;

i) selecting, by the network device at the egress of the IP over UDP tunnel, one of a plurality of forwarding tables using a UDP destination port value in the received IP-in-IP packet; and j) forwarding, by the network device at the egress of the IP over UDP tunnel, the IP packet using the one of the plurality of forwarding tables selected.

10. The computer-implemented method of claim 1, further comprising:

d) receiving, by the network device at the egress of the IP over UDP tunnel, an IP-in-IP packet;

e) decapsulating, by the network device at the egress of the IP over UDP tunnel, the IP-in-IP packet to expose an IP packet;

f) selecting, by the network device at the egress of the IP over UDP tunnel, one of a plurality of forwarding tables using a UDP destination port value in the received IP-in-IP packet; and g) forwarding, by the network device at the egress of the IP over UDP tunnel, the IP packet using the one of the plurality of forwarding tables selected.

11. The computer-implemented method of claim 1, further comprising:

d) allocating, by the network device at the egress of a second IP over UDP tunnel, (1) a second UDP destination port value for the IP over UDP tunnel to (2) a second unique instance of a private connectivity service; and e) associating, by the network device at the egress of the second IP over UDP tunnel, a second forwarding table for the second unique instance of the private connectivity service and the second UDP destination port value.

12. The computer-implemented method of claim 11, wherein the second unique instance of a private connectivity service is a second virtual router and forwarder (VRF) instance.

13. A system comprising:

a first network device at an egress of an Internet Protocol (IP) over User Datagram Protocol (UDP) tunnel and belonging to a shared network, the network device at the egress of the IP over UDP tunnel including:

a) at least one processor; and b) a non-transitory computer-readable storage medium storing processor-executable instructions, which, when executed by the at least one processor, cause the at least one processor to perform a method of 1) allocating, by the first network device, (i) a UDP destination port value for the IP over UDP tunnel to (ii) a unique instance of a private connectivity service;

2) associating, by the first network device, a forwarding table for the unique instance of the private connectivity service and the UDP destination port value; and 3) advertising, by the network device at the egress of the IP over UDP tunnel to a network device at the ingress of the IP over UDP tunnel and belonging to the shared network, information associating (i) the UDP destination port value for the IP over UDP tunnel to (i) the unique instance of a private connectivity service, wherein the advertisement is included in a Border Gateway Protocol (BGP) message, and wherein the unique instance of a private connectivity service is a virtual router and forwarder (VRF) instance.

14. The system of claim 13, further comprising:

a second network device at an ingress of the IP over UDP tunnel and belonging to the shared network, wherein the method performed by the first network further includes:

3) advertising, by the first network device to the second network device, information associating (i) the UDP destination port value for the IP over UDP tunnel to (ii) the unique instance of a private connectivity service.

15. The system of claim 14, wherein the second network device includes a) at least one processor; and b) a non-transitory computer-readable storage medium storing processor-executable instructions, which, when executed by the at least one processor of the second network device, cause the at least one processor of the second network device to perform a method of 1) receiving, by the second network device, an IP packet associated with the unique instance of the private connectivity service;

2) encapsulating, by the second network device, the IP packet with an IP over UDP header to generate an IP-in-IP packet having (i) a UDP destination port field populated with the UDP destination port value, and (ii) an IP destination field populated with an IP address of the network device at the egress of the IP over UDP tunnel; and 3) transmitting, by the second network device, the IP-in-IP packet.

16. A non-transitory computer readable storage medium storing processor executable instructions, which, when executed by at least one processor, cause the at least one processor to perform a method comprising:

a) allocating, by a network device at the egress of an Internet Protocol (IP) over User Datagram Protocol (UDP) tunnel and belonging to a shared network, (1) a UDP destination port value for the IP over UDP tunnel to (2) a unique instance of a private connectivity service; and b) associating, by the network device at the egress of the IP over UDP tunnel, a forwarding table for the unique instance of the private connectivity service and the UDP destination port value; and c) advertising, by the network device at the egress of the IP over UDP tunnel to a network device at the ingress of the IP over UDP tunnel and belonging to the shared network, information associating (1) the UDP destination port value for the IP over UDP tunnel to (2) the unique instance of a private connectivity service, wherein the advertisement is included in a Border Gateway Protocol (BGP) message, and wherein the unique instance of a private connectivity service is a virtual router and forwarder (VRF) instance.

\* \* \* \* \*